(12) United States Patent
Shaw, II

(10) Patent No.: US 11,016,886 B2
(45) Date of Patent: *May 25, 2021

(54) MULTI-RING SHARED, TRAVERSABLE, AND DYNAMIC ADVANCED DATABASE

(71) Applicant: Webroot Inc., Broomfield, CO (US)

(72) Inventor: John R. Shaw, II, Broomfield, CO (US)

(73) Assignee: WEBROOT INC., Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/791,669

(22) Filed: Feb. 14, 2020

(65) Prior Publication Data
US 2020/0183835 A1 Jun. 11, 2020

Related U.S. Application Data

(63) Continuation of application No. 15/888,242, filed on Feb. 5, 2018, now Pat. No. 10,579,520.

(60) Provisional application No. 62/593,232, filed on Nov. 30, 2017.

(51) Int. Cl.
| | |
|---|---|
| *G06F 12/06* | (2006.01) |
| *G06F 12/14* | (2006.01) |
| *G06F 21/00* | (2013.01) |
| *G06F 16/00* | (2019.01) |

(52) U.S. Cl.
CPC ...... *G06F 12/0653* (2013.01); *G06F 12/0615* (2013.01); *G06F 12/1491* (2013.01); *G06F 16/00* (2019.01); *G06F 21/00* (2013.01); *G06F 2212/1016* (2013.01); *G06F 2212/1052* (2013.01)

(58) Field of Classification Search
CPC ............ G06F 12/0615; G06F 12/0623; G06F 12/0653; G06F 12/0692; G06F 2212/1016; G06F 2212/1052; G06F 2212/656
USPC ................................ 711/153, 170, 171, 202
See application file for complete search history.

(56) References Cited

U.S. PATENT DOCUMENTS

| | | |
|---|---|---|
| 7,827,375 B2 | 11/2010 | Abrashkevich et al. |
| 10,579,520 B2 | 3/2020 | Shaw |
| 2008/0127142 A1 | 5/2008 | Wrighton |
| 2013/0024631 A1 | 1/2013 | Balasubramanian |

(Continued)

OTHER PUBLICATIONS

Office Action for U.S. Appl. No. 15/888,242, dated Jun. 14, 2019, 7 pgs.

*Primary Examiner* — Gary J Portka
(74) *Attorney, Agent, or Firm* — Sprinkle IP Law Group

(57) ABSTRACT

Examples of the present disclosure describe systems and methods for sharing memory using a multi-ring shared, traversable and dynamic database. In aspects, the database may be synchronized and shared between multiple processes and/or operation mode protection rings of a system. The database may also be persisted to enable the management of information between hardware reboots and application sessions. The information stored in the database may be view independent, traversable, and resizable from various component views of the database. In some aspects, an event processor is additionally described. The event processor may use the database to allocate memory chunks of a shared heap to components/processes in one or more protection modes of the operating system.

20 Claims, 9 Drawing Sheets

(56) References Cited

U.S. PATENT DOCUMENTS

| | | | |
|---|---|---|---|
| 2013/0263149 A1* | 10/2013 | Dai | G06F 9/5016 718/104 |
| 2014/0115292 A1 | 4/2014 | Mclachlan | |
| 2017/0344468 A1 | 11/2017 | Kirshenbaum | |
| 2019/0163626 A1 | 5/2019 | Shaw | |

* cited by examiner

MULTI-RING SHARED, TRAVERSABLE, AND DYNAMIC ADVANCED DATABASE

CROSS-REFERENCE TO RELATED APPLICATIONS

This application is a continuation of, and claims a benefit of priority under 35 U.S.C. 120 from U.S. patent application Ser. No. 15/888,242 filed Feb. 5, 2018, entitled "Multi-Ring Shared, Traversable, and Dynamic Advanced Database", issued as U.S. Pat. No. 10,579,520, which claims the benefit of priority to U.S. Provisional Application No. 62/593,232 filed Nov. 30, 2017, entitled "Multi-Ring Shared, Traversable, and Dynamic Advanced Database," which are hereby fully incorporated by reference for all purposes.

BACKGROUND

Various processing functionality of computing operating systems is split between a trusted kernel mode and an untrusted (or semi-trusted) user mode. Conventionally, information is shared between the two modes using I/O request packets (IRPs) or by sharing sections of memory. Using IRPs, however, can cause bottlenecks in application performance, and sharing memory is potentially insecure and does not allow for dynamic or easily traversable structured data.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for sharing memory using a multi-ring shared, traversable and dynamic database. In aspects, the database may be synchronized and/or shared between multiple processes and/or operation mode protection rings of a system. The database may also be persisted to enable the management of information between hardware reboots and application sessions. The information stored in the database may be view independent, traversable, and resizable from various component views of the database. In some aspects, a shared heap and event processor may additionally be described. The event processor and shared database may both utilize the shared heap which allocates and frees memory in its heap. In such aspects, the event processor and shared database may be able to access, traverse, and manipulate the data in one or more protection modes of the operating system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
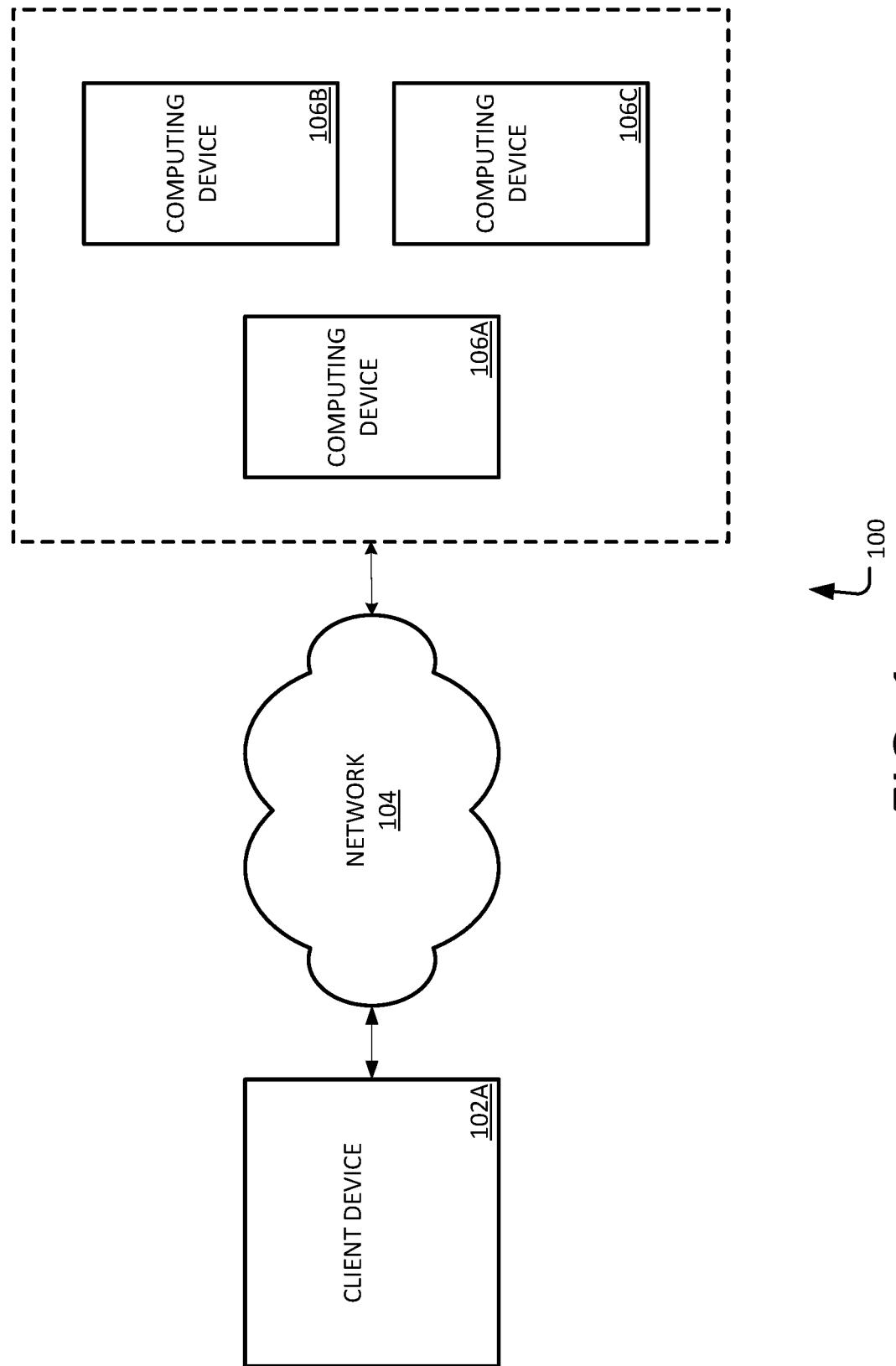
FIG. 1 illustrates an overview of an example system for sharing memory using a dynamic memory database as described herein.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure describes systems and methods for sharing memory using a multi-ring shared, traversable and dynamic database. Generally, modern operating systems spend the majority of the time executing code and operations in either kernel mode or user mode. Kernel mode is generally reserved for trusted, core operating system components and functions. Accordingly, the code and operations executed in kernel mode are permitted unrestricted access to CPU instructions, memory addresses, and underlying hardware. User mode is generally reserved for untrusted (or semi-trusted) applications and services. In user mode, the code and operations executed are not permitted to directly access the underlying hardware or the various memory addresses. Instead, the applications/services must use system APIs and/or memory sharing techniques to access the hardware and memory addresses. Such techniques, however, may cause bottlenecks in system/application performance or may pose security concerns. To address such shortcomings, aspects of the present disclosure enable contextual information related to file determinations and process behavioral information across the system to be securely accessible and manipulable between various system operation modes. Such aspects enable, as an example, network operations and signature processing to be offloaded from kernel mode to user mode, while kernel mode executes low-level tasks, such as blocking and filtering.

In aspects, an operating system of a computing device may receive an instruction to execute an application, a service, a command set, or a system resource. In response to the initiation instruction, the operating system may cause a chunk of system memory to be reserved and/or mapped into the kernel mode and the user mode of the operating system. In examples, the memory addresses of the system memory mapped to the kernel mode may be different from the memory addresses of the memory mapped to the user mode. For instance, the virtual memory addresses mapped to the kernel mode may represent physical memory addresses. Similarly, the memory addresses mapped into a user mode process virtual address space may be different from the kernel mode virtual addresses. In aspects, the system memory mapped to the kernel mode and user mode may be managed by a memory management unity or utility (MMU). Generally, an MMU is an operating system component that performs translations of virtual memory addresses to physical addresses. In the aspects described herein, an MMU may refer to a shared memory heap comprising (or associated with) a data structure, such as a database, an AVL tree, a binary tree, a list, etc. The shared memory heap data structure may comprise information from, or related to, a shared heap. A shared heap, as used herein, may refer to an area of dynamically-allocated memory that is shared by one or more processes. The shared memory heap data structure may additionally comprise a pointer object that references locations in the shared heap based on offsets from one or more locations in the shared heap. The inclusion of such a pointer object may enable view-independent access to the shared heap. In examples, the pointer object may be accessible to kernel mode components and user mode components. For instance, a user mode component may access the pointer object to request a chunk of memory. In response, the pointer object may facilitate access to the requested chunk of memory to the user mode component, and may synchronize the allocated memory (and/or information associated therewith) with the kernel mode data in the shared memory heap database. As another example, a kernel mode component may access the pointer object to determine the location of a memory address allocated to a user mode component. In response, the shared heap may facilitate the execution of a find or seek operation. The find/seek operation may be evaluated against a search structure (such as an AVL tree) comprising kernel mode and user mode memory addresses. A pointer indicating the location of one or more memory addresses may be returned by the search structure and translated by the shared memory heap database into a memory address.

In aspects, the shared memory heap database may enable the information therein to be synchronized and shared between multiple protection rings in the operating system. Additionally, the shared memory heap database may enable the information therein to be persisted between hardware reboots and software execution cycles. In examples, the information on the shared memory heap database may be traversable and resizable for any components view of the database (e.g., kernel mode components, user mode components, intermediate protection ring components, etc.).

Accordingly, the present disclosure provides a plurality of technical benefits including but not limited to: securely synchronizing and sharing information between multiple protection rings in the operating system; persisting memory management information between hardware boots and application cycles; a traversable and resizable memory database; dynamic, mode-independent (e.g., kernel mode, user mode, etc.) viewing of memory management information; managing memory information/state between modes or components of an operating system; implementing an event processor configured to utilize the shared memory, among other examples.

FIG. 1 illustrates an overview of an example system for sharing memory using a dynamic memory database, as described herein. Example system 100 presented is a combination of interdependent components that interact to form an integrated whole for sharing memory using a dynamic memory database. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an example system 100 may provide an environment for software components to run, obey constraints set for operating, and utilize resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic devices. As an example of a processing device operating environment, refer to the example operating environments depicted in FIG. 9. In other examples, the components of systems disclosed herein may be spread across multiple devices. For instance, input may be entered on a client device and information may be processed or accessed from other devices in a network, such as one or more server devices.

As one example, the system 100 comprises client devices 102A, distributed network 104, and distributed server environment comprising computing devices 106A-C. One of skill in the art will appreciate that the scale of systems such as system 100 may vary and may include more or fewer components than those described in FIG. 1. In some examples, interfacing between components of the system 100 may occur remotely, for example, where components of system 100 may be spread across one or more devices of a distributed network.

In aspects, client device 102 may comprise an operating system configured to be operated in one or more protection modes. The various protection modes may provide different level of access to hardware and software resources of client device 102. Examples of protection modes may include kernel mode, device driver mode, user mode and the like. The operating system of client device 102 may be configured to implement one or more shared memory techniques. The shared memory techniques may enable multiple operating system resources to simultaneously access memory in order to pass data between the resources. As a specific example, client device 102 may comprise, or have access to, the dynamic memory database described herein. In examples, the dynamic memory database may be configured to store memory information and metadata related to a shared memory of client device 102. The dynamic memory database may comprise one or more memory indexes and a pointer object/manager. The pointer object/manager may use the memory index(es) to efficiently traverse the dynamic memory database for memory addresses. The dynamic memory database may be accessible to components in the various protection modes of client device 102. For example, the dynamic memory database may be accessible to a kernel mode device driver and a user mode service of client device 102. In alternate examples, the dynamic memory database may be configured to store memory information and metadata of one or more other computing devices, such as computing devices 106A-C. For instance, one or more of computing devices 106A-C may have access to client device 102 via network 104. Examples of computing device 106A-C may include desktop computers, laptops, mobile phones, wearable devices, PDAs, etc. Computing devices 106A-C may be permitted to access and/or execute operating system resources on client device 102, such as processes, applications, drivers, memory space, system APIs, etc. Based on the permitted access, computing device 106A-C may also have access to a dynamic memory database located on client device 102.

In some aspects, client device 102 may also comprise an event processor. In aspects, an event processor may be associated with the dynamic memory database. The event processor may utilize the dynamic shared memory to allocate memory chunks of the shared memory heap to components/processes in one or more protection modes. In examples, the event processor may "pend" a set of I/O request packets (IRPs). Pending an IRP, as described herein, may refer to marking an IRP with a status of pending until the IRP is completed or returned. The IRPs may be pended to a kernel mode component from a user mode component. For example, a thread in a user mode service may be started. In response, the event processor may perform the pending of a set of IRPs to a kernel mode driver from a user mode service. When an event occurs that pertains to (or invokes some aspect of) the user mode service, IRPs are popped of the stack and associated with an event object. Based on, for example, the event type, memory may be allocated to the shared heap. The pointer of the allocated memory may be added to the request data section of the IRP. The IRP may then be completed and the response data of the service may be allocated to the shared memory heap.

Figure 2:
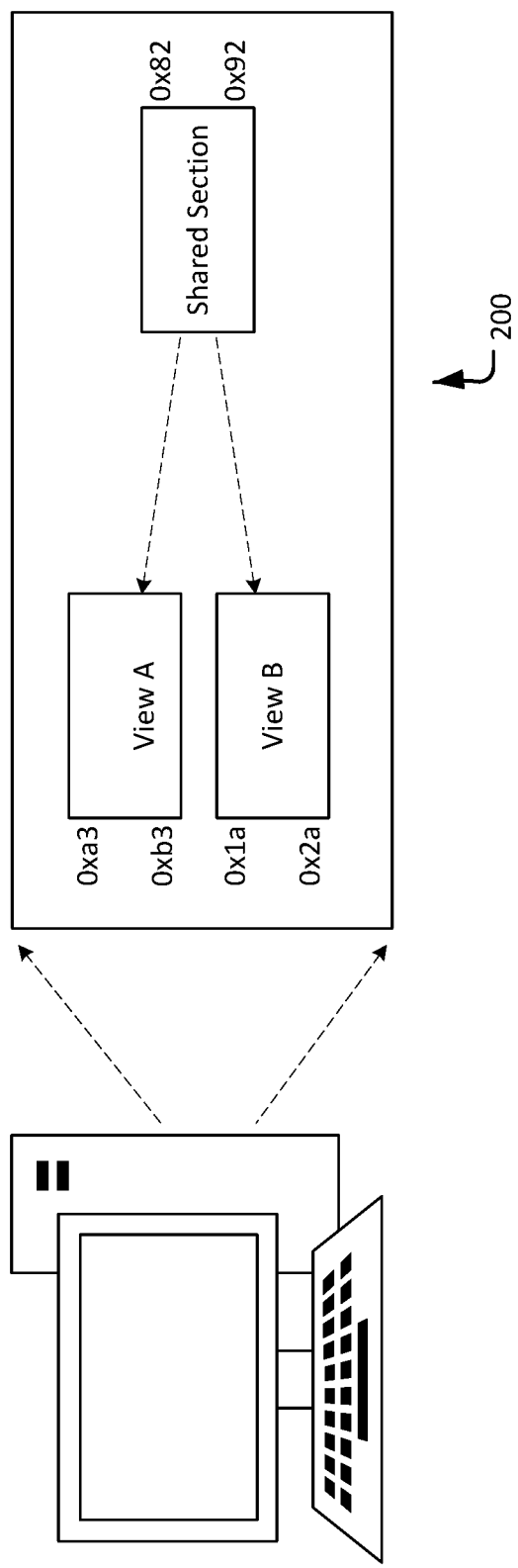
FIG. 2 illustrates a high-level representation of a shared memory section.

FIG. 2 illustrates a high-level representation of a shared memory section. The shared memory section of FIG. 2 may refer to at least a portion of the shared memory described in FIG. 1. In example representation 200, the shared memory section is located at physical address range 0x82 to 0x92 on the address bus circuitry of a computing device, such as client device 100. The shared memory section is mapped to View A and View B. In examples, View A may represent a view of the shared memory section from a first protection mode (or protection ring) of the operating system, such as kernel mode. View A may be mapped to the virtual address range 0xa3 to 0x b3. Kernel mode components may access the shared section using the virtual address range of View A. View B may represent a view of the shared memory section from a second protection mode (or protection ring) of the operating system, such as user mode. View B may be mapped to the virtual address range 0x1 a to 0x2a. User mode components may access the shared section using the virtual address range of View B.

Figure 3:
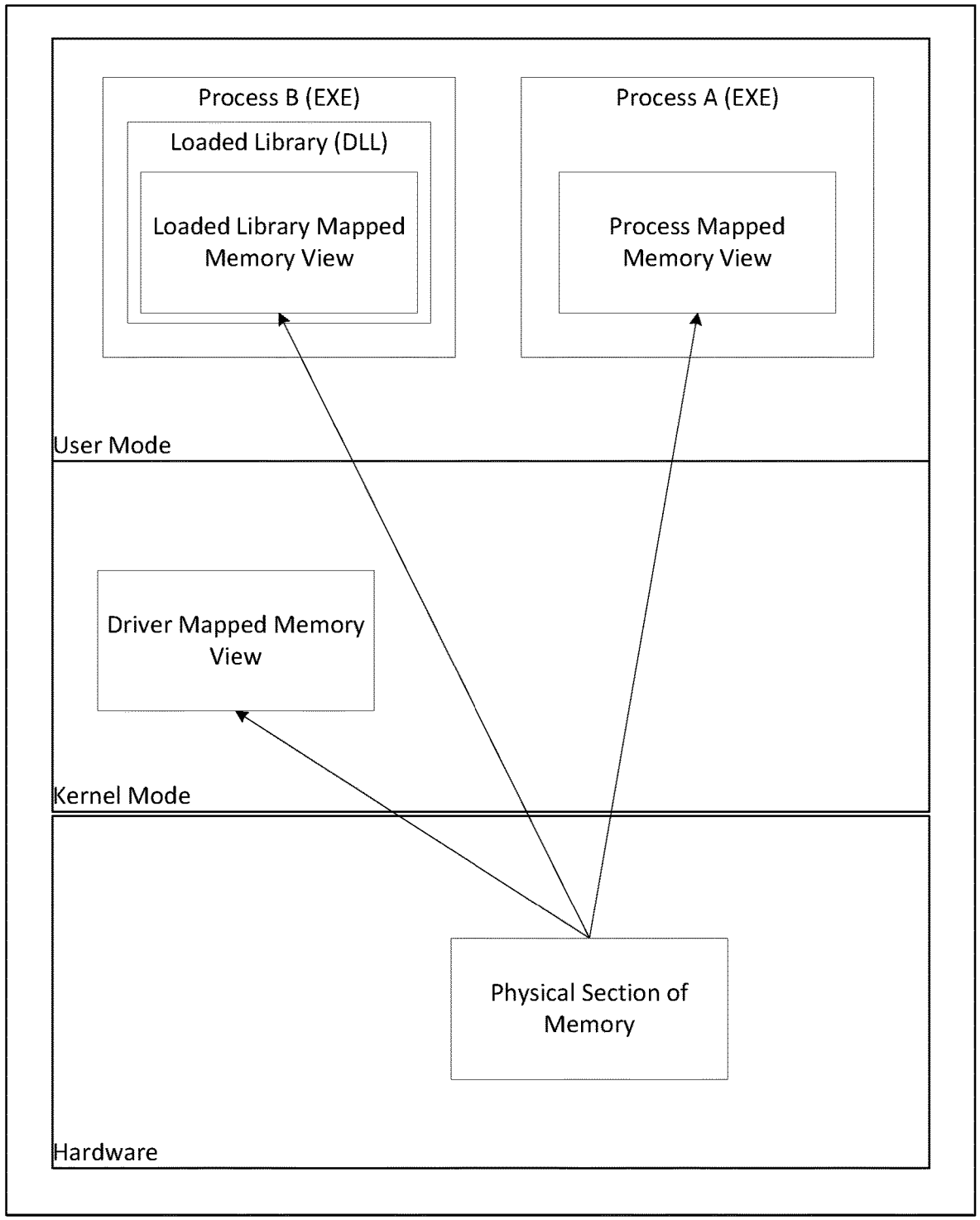
FIG. 3 illustrates a low-level representation of the shared memory section in FIG. 2.

FIG. 3 illustrates a low-level representation of the shared memory section in representation 200. Example representation 300 comprises a hardware layer, a kernel mode, a user mode and chunks of the shared memory section. The hardware layer comprises the physical section of the shared memory section (e.g., physical address range 0x82 to 0x92). The physical section of the shared memory section is mapped to the kernel mode and user mode. The kernel mode comprises a driver-mapped memory view of the shared memory section (e.g., 0xa3 to 0xb3). The user mode comprises Process A and Process B. Process A has access to a process-mapped memory view of the shared memory section. Process B comprises a loaded library file having access to a loaded library-mapped memory view of the shared memory section.

Figure 4:
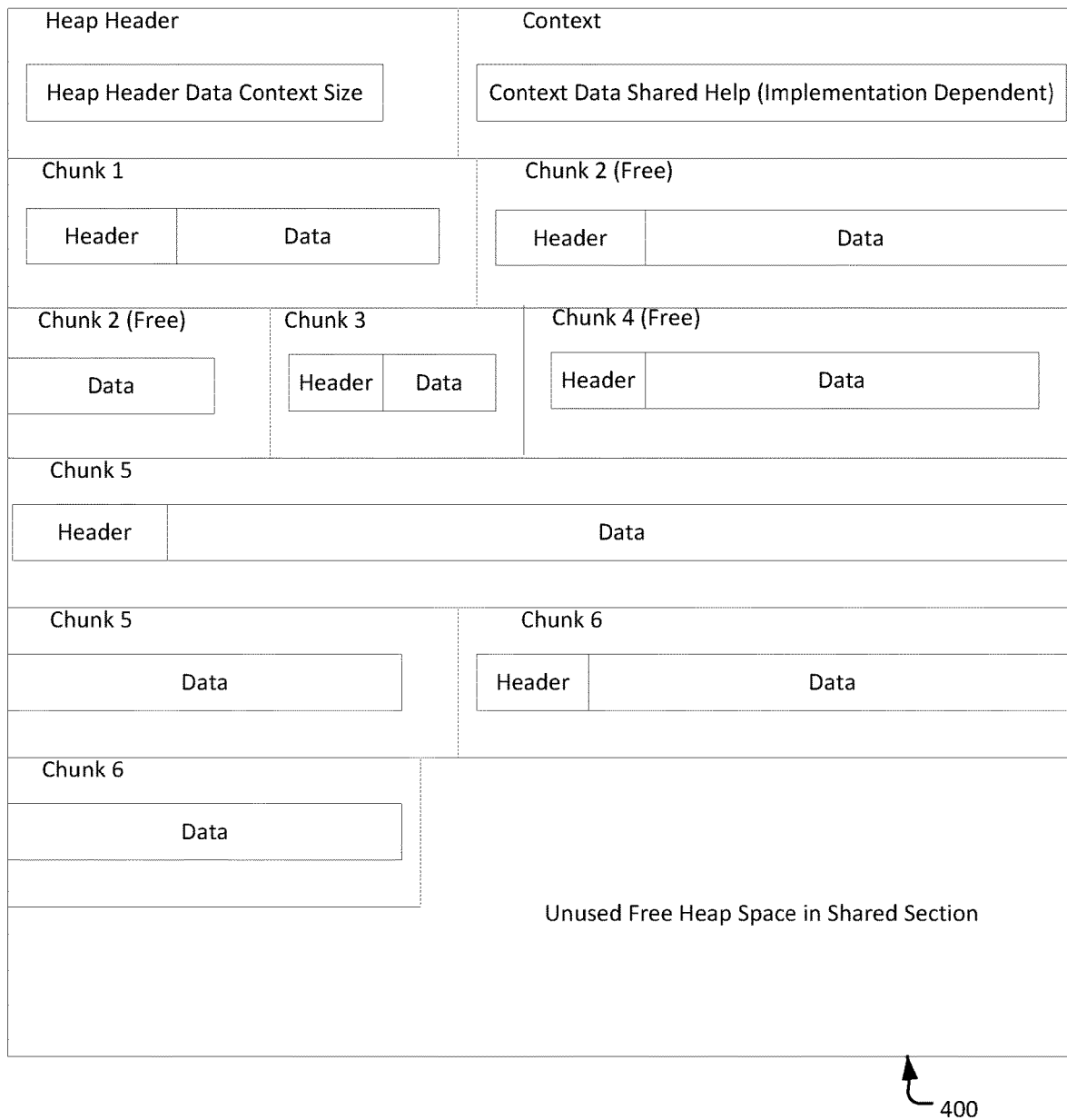
FIG. 4 illustrates a representation of the current state of a shared memory section.

FIG. 4 illustrates a representation of the current state of a shared memory section. In examples, representation 400 may correspond to the shared memory section described in FIG. 2 and FIG. 3. Example representation 400 comprises a heap header section, a context section, various chunk sections and a free memory section. The heap header section may comprise contextual information for use by the shared heap. The contextual information may include header data for the shared memory section, such as high watermark, bins (used to hold free memory chunks), top chunk, last remainder chunk, etc. Implementation dependent contextual information may also be described by contextual information of a shared database or event processor. Alternately, the shared heap may allocate one or more of the various chunk sections to store the contextual information. The various chunk sections may represent the memory chunks (or pages) of the shared memory space. Chunks/pages may be created using various memory paging techniques known to those of skill in the art. Each memory chunk may individually comprise header and data sections. The headers section of the memory chunk may comprise, for example, information about the memory chunk type, pointers to the memory chunks before and after the current memory chunk, and an indication of whether the memory chunk is currently free. The data section may comprise one or more memory addresses and/or offsets (e.g., chunk/page offsets, frame offsets, etc.). The context section may be reserved for an object that extends the shared heap. In examples, such an object may be the dynamic memory database described in FIG. 1. The context section may comprise contextual data related to the object, such as the root node of the object (e.g., the root node of the corresponding AVL tree), the number of elements in the object, etc. The free memory section may represent the unused free heap space in the shared memory section. In aspects, an event processor (described in more detail in FIG. 7) may store contextual information such as overarching event information across the system. In examples, the contextual information may be independent from where the event originated.

Figure 5:
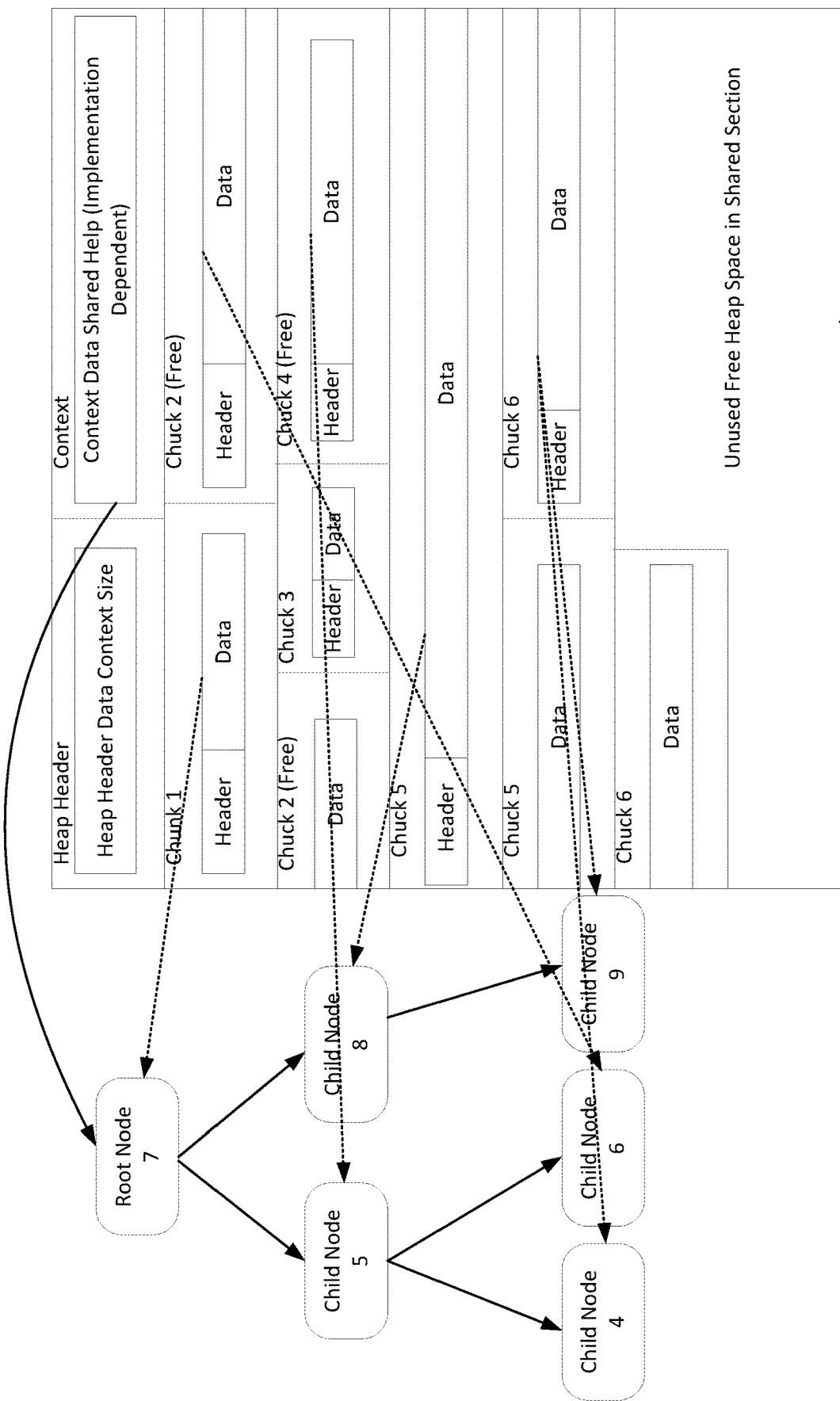
FIG. 5 illustrates a representation of a dynamic memory data structure for the current state of the shared memory section.

FIG. 5 illustrates a representation of a dynamic memory data structure for the current state of the shared memory section. Example representation 500 comprises a plurality of nodes (e.g., nodes 4-9) representing the various memory chunks illustrated in the state view of a shared memory section. In aspects, the nodes may be arranged in various configurations to reflect the dynamic memory data structure being used. For example, the nodes may be arranged in a tree configuration to reflect the implementation of a tree data structure, such as an AVL tree or binary tree. As another example, the nodes may be arranged in one or more vertical columns to reflect the implementation of a list or list-based structure. In example representation 500, nodes 4-9 are arranged in a tree configuration. Node 7 is indicated as the root node of the dynamic memory data structure. The contextual information identifying root node 7 as a root node is stored in the context section of the state view of the shared memory section (as described in FIG. 4). Root node 7 is associated with (or comprises) the data in memory chunk 1 of the state view. Nodes 5 and 8 are child nodes of root node 7. Child node 5 is associated with the data in memory chunk 4 of the state view. Child node 8 is associated with the data in memory chunk 5 of the state view. Nodes 4 and 6 are child nodes of child node 5. Child node 4 is associated with the data in memory chunk 6 of the state view. Child node 6 is associated with the data in memory chunk 2 of the state view. Node 9 is a child node of child node 8. Child node 9 is associated with the data in memory chunk 6 of the state view.

Having described various systems that may be employed by the aspects disclosed herein, this disclosure will now describe various methods that may be performed by various aspects of the disclosure. In aspects, method 600 may be executed by an example system, such as system 100 of FIG. 1. In examples, method 600 may be executed on a device, such as client device 102, comprising at least one processor configured to store and execute operations, programs or instructions. However, method 600 is not limited to such examples. In other examples, method 600 may be performed by one or more components of a distributed network, such as a web service/distributed network service (e.g. cloud service).

Figure 6:
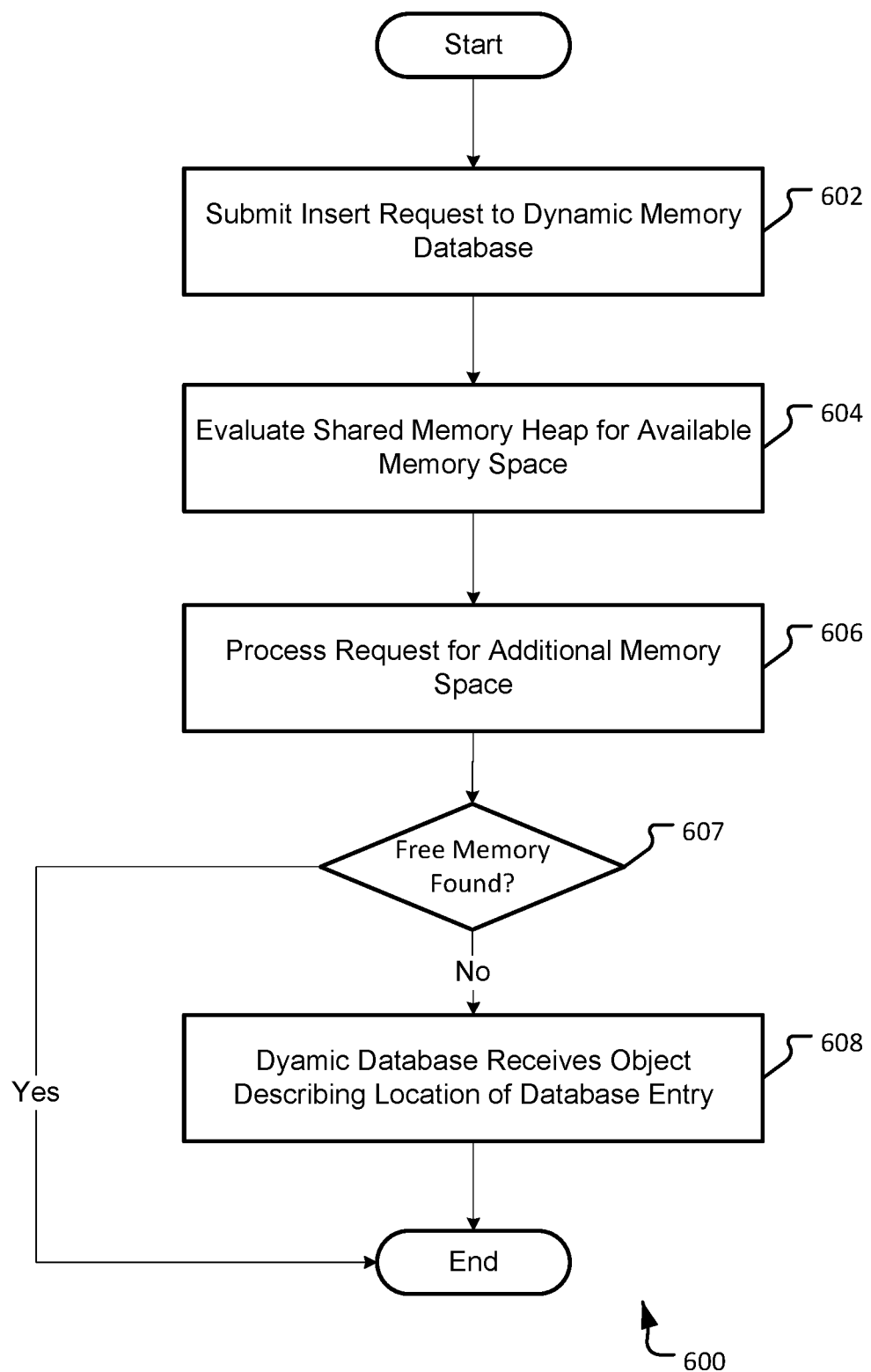
FIG. 6 illustrates an example method for updating the dynamic memory database described herein.

FIG. 6 illustrates an example method 600 for updating the dynamic memory database described herein. In aspects, a computing device implementing two or more protection modes may use a MMU to manage a shared memory heap. The shared memory heap may be associated with a dynamic memory database or similar data structure, as described in FIG. 1. The dynamic memory database may comprise information relating to memory chunks of the shared memory heap. A portion of the information may correspond to mappings between the physical memory addresses and virtual memory addresses of the memory chunks. The physical and/or virtual memory addresses may be exposed to components and processes in the various protection modes based on a security level of the protection modes. For example, a trusted kernel mode component (high security level) may be able to access the physical and virtual address of a shared memory chunk from the dynamic memory data structure; whereas, a user mode component (low security level) may only be able to access the virtual address of a shared memory chunk from the dynamic memory data structure.

Example method 600 begins at operation 602, where a component attempts to insert an entry into a dynamic memory database. In aspects, a user mode (or kernel mode) service may execute an instruction intended to insert an entry into a shared memory heap. Concurrently, or prior to completion of the instruction, a kernel mode (or user mode) component may process an unrelated operation. The unrelated operation may necessitate the update of an entry in the dynamic memory database corresponding to the shared memory heap. The technology described herein enables the seamless execution of such processes/instructions. As one example, in response to detecting the executed instruction (via, for example an interrupt handler or API call), a kernel mode driver may attempt to enter the memory entry into the dynamic memory database corresponding to the shared memory heap.

At operation 604, the dynamic memory database may evaluate the shared memory heap for available memory space. In aspects, in response to receiving a request to make an entry in the dynamic memory database, the dynamic memory database will evaluate the shared memory heap to determine whether the shared memory heap comprises enough free space to accommodate the entry. If it is determined that the shared memory heap does not comprise enough free space to accommodate the entry, the dynamic memory database informs the requesting kernel mode component of the need for additional memory space. The requesting kernel mode component may then communicate the request to the shared memory heap.

At operation 606, the shared memory heap may process the request for additional memory. In aspects, the shared memory heap may receive a request to allocate additional memory space. Example method 600 may then proceed to decision operator 607. At decision operation 607, a decision may be made based on whether free memory is found. In aspects, the shared memory heap may evaluate whether free memory is available. If the shared memory heap identifies free memory, example method 600 ends. If the shared memory heap does not identify free memory, the shared memory heap may map one or more additional sections of unused/free memory; thereby, extending the size of the shared memory heap. The shared memory heap may then copy the current information and/or the state of the dynamic memory heap. In some aspects, the copied information may be stored in, or associated with, one or more objects.

At operation 608, the dynamic memory database may receive an object describing information relating to a database entry. In aspects, the dynamic memory database may receive (or have access to) an object having a view of the shared memory heap. The object may describe (or otherwise indicate) a database entry corresponding to one or more operations/instructions associated with the shared memory heap. Based on the object, the dynamic memory database may populate the database entry of the dynamic memory database. The dynamic memory database may then insert the entry request into the shared heap memory reserved/allocated for the operations/instructions. In at least one aspect, the dynamic memory database may further map the memory information (e.g., one or more physical and/or virtual memory addresses) to various components/processes of one or more system protection modes.

Figure 7:
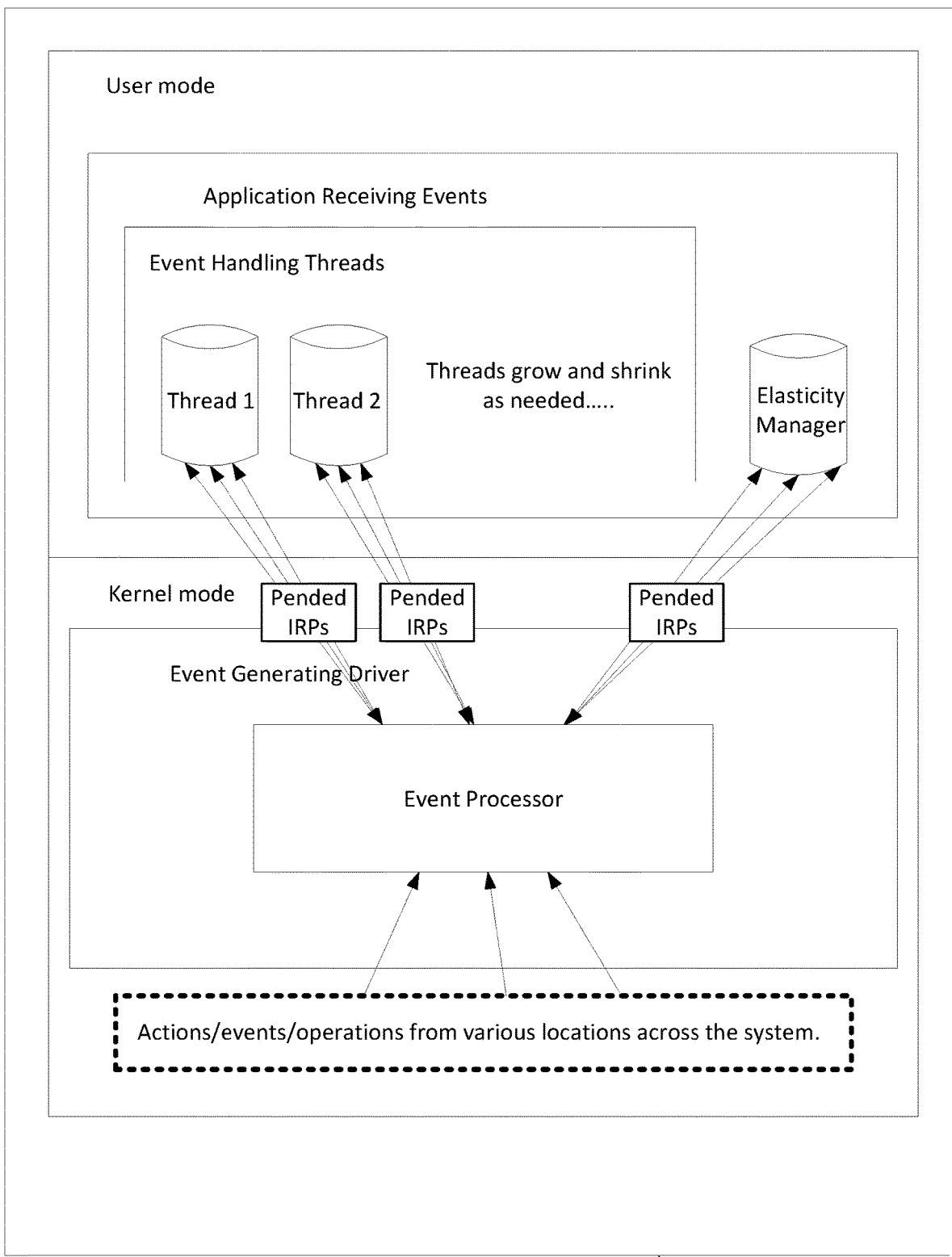
FIG. 7 illustrates a representation of the event processor as described herein.

FIG. 7 illustrates a representation of the event processor described in FIG. 1. This representation describes a kernel component generating events, but is not so limited. For example, a loaded library in a remote process may also generate events to be consumed by the event processor. Example representation 700 comprises a kernel mode and a user mode. The kernel mode comprises an event generating driver for generating and/or detecting events in the operating system of a computing device, such as client device 102. The event generating driver comprises an event processor. The event processor collects/detects actions, events and operations from various locations throughout the operating system. The user mode comprises an event-receiving application that receives actions, events and operations from various locations throughout the operating system. The event-receiving application comprises elasticity manager and a set of event handling threads. The elasticity manager is configured to monitor and/or maintain the number of event handling threads spawned by the event-receiving application. The event handling threads are used to transmit data between the event-receiving application and the event processor. For example, when the event-receiving application receives an actions/event/operation of interest, the event-receiving application receives event information allocated to a shared heap by the event generator. The event-receiving application returns response data to the event generator by allocating memory to a shared heap.

Figure 8:
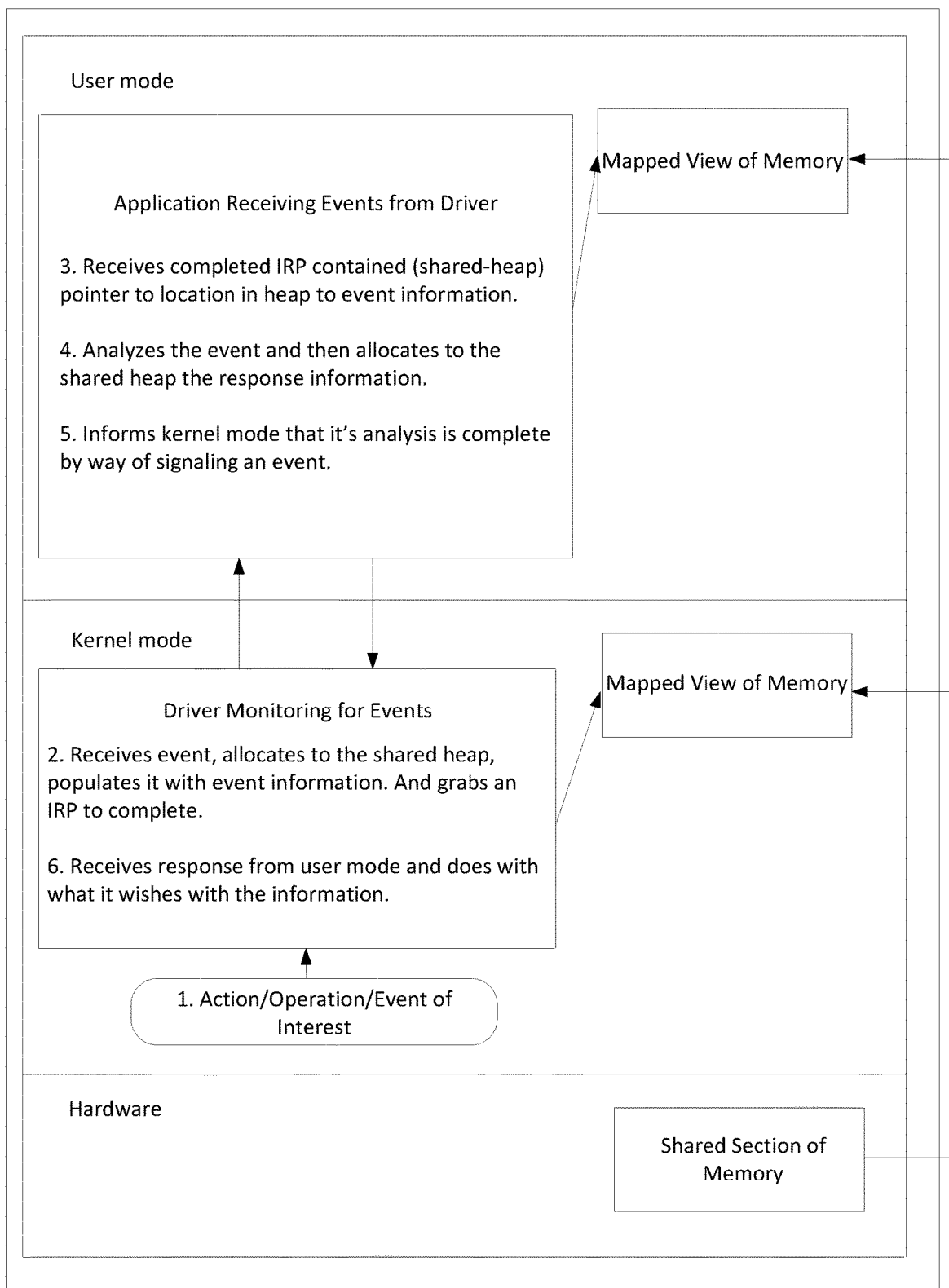
FIG. 8 illustrates a low-level representation of a shared memory section.

FIG. 8 illustrates a low-level representation of a shared memory section. Example representation 800 comprises a hardware layer, a kernel mode and a user mode. The hardware layer comprises a shared memory section. The shared memory section is mapped to the kernel mode and user mode. The kernel mode comprises an event-monitoring driver and a mapped view of the shared memory section. The user mode comprises an event-receiving application and a mapped view of the shared memory section. In examples, the event-monitoring driver may receive or detect an action, event or operation of interest. After receiving the event, the event-monitoring driver may allocate a corresponding actions/event/operation object to the shared heap, populate the object with event information and select an IRP to complete the actions/event/operation. The event-receiving application may receive the IRP comprising a pointer to the location of the actions/event/operation object in the shared heap. After analyzing the event, the event-receiving application may allocate the response information to the shared heap. The event-receiving application then communicates a signal to the kernel mode indicating the analysis is complete. The event-monitoring driver receives the response from the user mode and processes the response appropriately.

Figure 9:
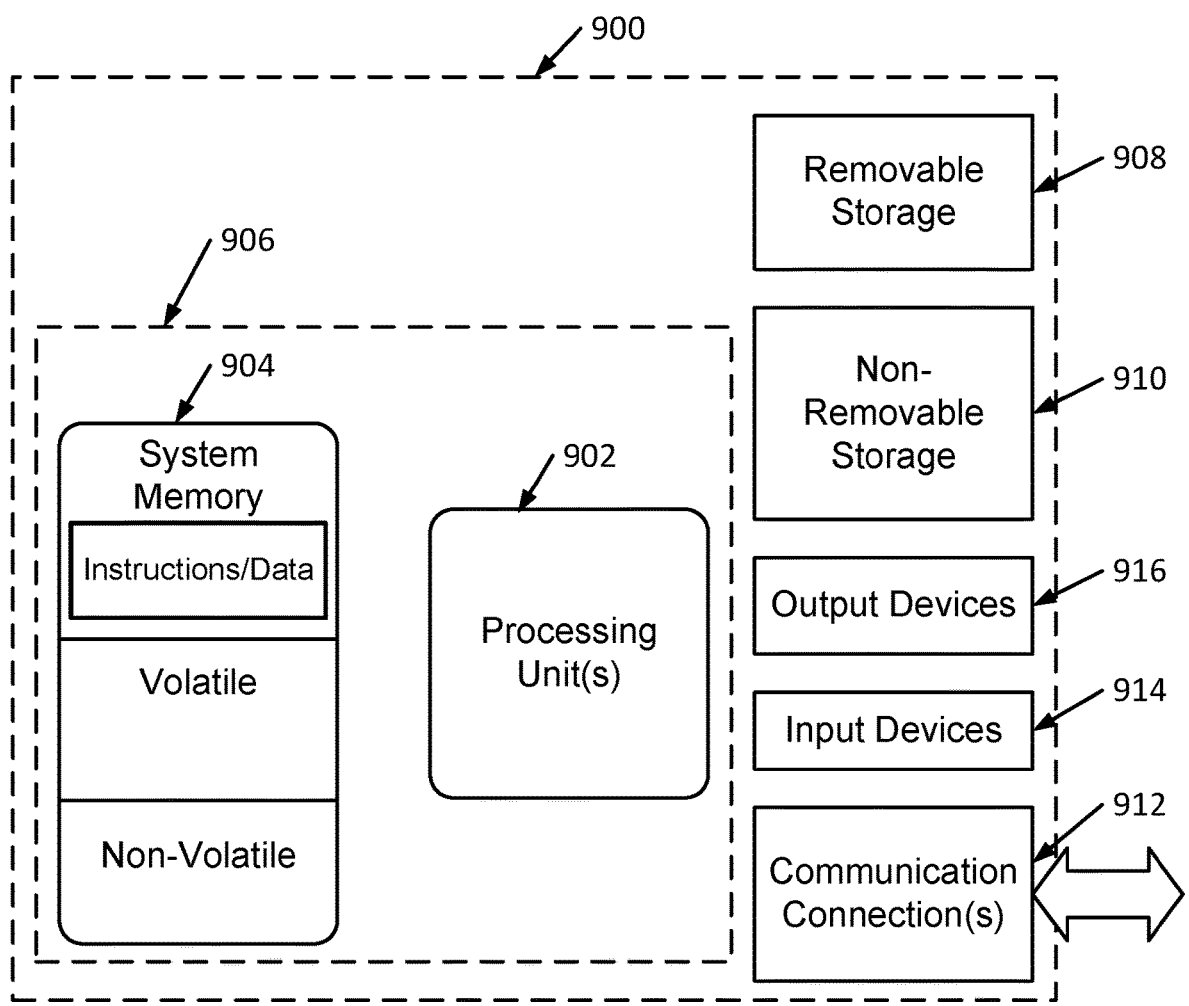
FIG. 9 illustrates a suitable operating environment in which one or more of the present embodiments may be implemented.

FIG. 9 illustrates one example of a suitable operating environment 900 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 900 typically includes at least one processing unit 902 and memory 904. Depending on the exact configuration and type of computing device, memory 904 (storing, among other things, a dynamic memory data structure, an event processor, instructions to perform the methods disclosed herein, etc.) may be volatile (such as RAM), non-volatile (such as ROM, flash memory, etc.), or some combination of the two. This most basic configuration is illustrated in FIG. 9 by dashed line 906. Further, environment 900 may also include storage devices (removable, 908, and/or non-removable, 910) including, but not limited to, magnetic or optical disks or tape. Similarly, environment 900 may also have input device(s) 914 such as keyboard, mouse, pen, voice input, etc. and/or output device(s) 916 such as a display, speakers, printer, etc. Also included in the environment may be one or more communication connections, 912, such as LAN, WAN, point to point, etc.

Operating environment 900 typically includes at least some form of computer readable media. Computer readable media can be any available media that can be accessed by processing unit 902 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 900 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
one or more processors; and
memory coupled to at least one of the one or more processors, the memory comprising computer executable instructions that, when executed by the at least one process or, performs a method comprising:
receiving, from a component of the system, a request to make an entry in a dynamic memory database comprising information relating to a shared memory heap, wherein the dynamic memory database is synchronized between two or more processes executing in different operating system modes;

determining, by the dynamic memory database, that the shared memory heap does not comprise enough available memory space to accommodate the requested entry;

requesting, by the dynamic memory database, an allocation of additional memory space for the shared memory heap;

processing, by the shared memory heap, the request for the allocation of additional memory space, the processing including extending the size of the shared memory heap by mapping one or more additional sections of memory to at least one of the two or more processes; and inserting, by the dynamic memory database, the entry request into the shared memory heap.

2. The system of claim 1, wherein the dynamic memory database comprises one or more objects of a shared memory heap.

3. The system of claim 1, wherein the dynamic memory database is persisted to enable management of information between hardware reboots and application sessions.

4. The system of claim 1, wherein different operating system operation modes comprise at least a kernel mode and a user mode.

5. The system of claim 1, wherein processing the request for the allocation of additional memory space further comprises copying a current state of the shared memory heap.

6. The system of claim 5, wherein allocating additional memory space further comprises mapping one or more additional sections of free memory to the shared memory heap to create a modified shared memory heap and copying data in the current state of the shared memory heap to the modified shared memory heap.

7. The system of claim 6, wherein information mapped to at least one of the two or more processes comprises at least memory addresses from the modified shared memory heap and a pointer object.

8. The system of claim 7, wherein the pointer object describes a database entry of the dynamic memory database, wherein the database entry corresponds to one or more operations associated with the shared memory heap.

9. The system of claim 1, wherein the dynamic memory database comprises view independent information.

10. A method comprising:

receiving, from a component of the system, a request to make an entry in a dynamic memory database comprising information relating to a shared memory heap, wherein the dynamic memory database is synchronized between two or more processes executing in different operating system modes;

determining, by the dynamic memory database, that the shared memory heap does not comprise enough available memory space to accommodate the requested entry;

requesting, by the dynamic memory database, an allocation of additional memory space for the shared memory heap;

processing, by the shared memory heap, the request for the allocation of additional memory space, the processing including extending the size of the shared memory heap by mapping one or more additional sections of memory to at least one of the two or more processes; and inserting, by the dynamic memory database, the entry request into the shared memory heap.

11. The method of claim 10, wherein the dynamic memory database comprises one or more objects of a shared memory heap.

12. The method of claim 10, wherein the dynamic memory database is persisted to enable management of information between hardware reboots and application sessions.

13. The method of claim 10, wherein different operating system operation modes comprise at least a kernel mode and a user mode.

14. The method of claim 10, wherein processing the request for the allocation of additional memory space further comprises copying a current state of the shared memory heap.

15. The method of claim 10, wherein the dynamic memory database comprises view independent information.

16. A computer storage media encoding computer executable instructions which, when executed by at least one processor, performs a method for sharing memory using a dynamic memory database, comprising:

submitting a request to a dynamic memory database that is synchronized between two or more processes executing in different operating system operation modes, wherein the dynamic memory database comprises one or more objects of a shared memory heap;

evaluating a shared memory heap associated with the dynamic memory database to determine whether memory space is available to perform the request;

when it is determined that the memory space is not available:

copying a current state of the shared memory heap;

adding additional memory space to the shared memory heap to create a modified shared memory heap; and inserting the current state of the shared memory heap into the modified shared memory heap;

inserting the request to the dynamic memory database; and mapping memory information of the modified shared memory heap to at least one of the two or more processes.

17. The computer storage media of claim 16, wherein the dynamic memory database is persisted to enable the management of information between hardware reboots and application sessions.

18. The computer storage media of claim 16, wherein the dynamic memory database may be traversed and resized from various component view of the dynamic memory database.

19. The computer storage media of claim 16, wherein the dynamic memory database comprises a pointer object that references locations in the shared memory heap based on offsets from one or more locations in the shared memory heap.

20. The computer storage media of claim 16, wherein the dynamic memory database is populated with data from the shared memory heap, and wherein the dynamic memory database is a representation of the shared memory heap.

* * * * *